United States Patent [19]

Deribas et al.

[11] 4,242,787
[45] Jan. 6, 1981

[54] METHOD FOR JOINING FIBERGLASS PLASTIC ROD TO METAL FITTING OF ELECTRICAL DEVICE

[76] Inventors: Andrei A. Deribas, ulitsa Pravdy, 1, kv. 20; Alexei I. Limasov, ulitsa 1905 goda, 85, kv. 110; Alexei I. Matytsin, Morskoi prospekt, 5, kv. 32; Anatoly M. Staver, Morskoi prospekt, 36, kv. 10; Rudolf I. Shebalin, ulitsa Serebrenikovskaya, 16, kv. 4, all of Novosibirsk; Jury N. Yashin, Slavyansk, Parkovy pereulok, 7, kv. 52, Donetskaya oblast, all of U.S.S.R.

[21] Appl. No.: 931,424

[22] Filed: Aug. 7, 1978

[51] Int. Cl.³ .............................................. B23P 17/00
[52] U.S. Cl. .................................... 29/421 E; 29/517; 29/863; 72/DIG. 24
[58] Field of Search .................. 29/421 E, 421 M, 517, 29/863; 72/DIG. 23, DIG. 24, DIG. 25, DIG. 26, DIG. 30, 56; 174/176, 177, 179, 186; 403/267, 268, 282, 285

[56] References Cited

U.S. PATENT DOCUMENTS

| | | | |
|---|---|---|---|
| 2,367,206 | 1/1945 | Davis | 403/285 X |
| 3,152,392 | 10/1964 | Coppack et al. | 174/177 X |
| 3,192,622 | 7/1965 | Bannerman | 174/177 X |
| 3,341,650 | 9/1967 | Broske | 29/421 E |
| 3,684,820 | 8/1972 | Johnsen | 29/421 E |
| 3,844,665 | 10/1974 | Smith et al. | 403/267 |
| 4,130,926 | 12/1978 | Willem | 29/517 X |

FOREIGN PATENT DOCUMENTS

| | | | |
|---|---|---|---|
| 2128412 | 1/1973 | Fed. Rep. of Germany | 174/176 |
| 76254 | 11/1917 | Switzerland | 174/176 |
| 79248 | 10/1918 | Switzerland | 174/176 |
| 508288 | 7/1971 | Switzerland | 29/421 E |

*Primary Examiner*—Ervin M. Combs
*Attorney, Agent, or Firm*—Steinberg & Raskin

[57] ABSTRACT

According to the method for joining a fiberglass plastic rod to a metal fitting of an electrical device, a bore is first provided in the metal fitting, the diameter of said bore being somewhat greater than that of the fiberglass plastic rod. One of the rod's ends is then installed in the bore, and the gap defined between the bore formed in the metal fitting and fiberglass plastic rod is filled with a porous material. The whole is then compressed by using the pulse loading technique. The use of pulse loading for joining the fiberglass plastic rod to the metal fitting makes it possible to develop a high pressure in the zone of the joint without destroying the rod; this task is facilitated by the presence of the porous layer between the rod and metal fitting. Compression by pulse loading does not necessitate the use of expensive equipment, nor does it impose stringent accuracy requirements upon the elements to be joined. The method according to the invention accounts for a desired distribution of pressure over the inbuilt end of the fiberglass plastic rod.

5 Claims, 5 Drawing Figures

METHOD FOR JOINING FIBERGLASS PLASTIC ROD TO METAL FITTING OF ELECTRICAL DEVICE

FIELD OF THE INVENTION

The present invention relates to electrical engineering and, more particularly, to methods for joining fiberglass plastic rods to metal fittings of electrical devices.

The invention is applicable to the manufacture of carrier fittings of fiberglass plastic insulators, spacers, guys, breaker rods, etc.

BACKGROUND OF THE INVENTION

A fiberglass plastic rod must be joined to a metal fitting so as to ensure a high strength of the unit.

There is known a method for joining a fiberglass plastic rod to a metal fitting of an electrical device, whereby one of the ends of the fiberglass plastic rod is sawed along the rod's axis into two parts which are then wedged apart in the cone-shaped cavity of the metal fitting.

This method is disadvantageous in that the wedging affects the mechanical characteristics of the rod. Another disadvantage of this method lies in a concentration of mechanical stresses at the place where the fiberglass plastic rod comes out of the metal fitting.

There is further known a method for joining a fiberglass plastic rod to a metal fitting of an electrical device (cf. Elettrificazione, No. 6, 1971), according to which a hole of a diameter somewhat in excess of that of the fiberglass plastic rod is provided in the metal fitting to receive one of the ends of the fiberglass plastic rod. The whole unit is then pressed on a hydraulic press.

The joining must be done so as to provide a uniform compression, ensure a desired distribution of pressure over the length of the built-in portion of the rod, and keep the rod intact under pressure. To achieve these goals, one must use dies of complex shapes and impose stringent accuracy to size requirements on the metal fittings and fiberglass plastic rods.

SUMMARY OF THE INVENTION

It is an object of the present invention to improve the mechanical strength of the joint between the fiberglass plastic rod and metal fitting.

It is another object of the invention to simplify the joining process.

The foregoing objects are attained by providing a method for joining a fiberglass plastic rod to a metal fitting of an electrical device, whereby a bore of a diameter somewhat in excess of that of the fiberglass plastic rod is provided in the metal fitting to receive one of the ends of the fiberglass plastic rod, whereupon the unit is subjected to compression, the method being characterized, in accordance with the invention, in that prior to compression the gap defined between the fiberglass plastic rod and bore in the metal fitting is filled with a porous material to form a porous layer, and in that the compression of the unit is effected by means of pulse loading.

The porous layer may comprise a powdered material, as well as a metal grid or fibrous structure.

The use of pulse loading for joining the fiberglass plastic rod to the metal fitting makes it possible to develop, without destroying the fiberglass plastic rod, a much higher pressure in the zone of the joint than in the case of the conventional methods discussed above. This task is simplified by the presence of the porous layer between the rod and fitting. Pulse loading does not necessitate the use of expensive equipment; nor does it impose stringent accuracy to size requirements upon the elements to be joined.

The method according to the invention makes it possible to achieve a desired distribution of pressure over the inbuilt end of the fiberglass plastic rod.

BRIEF DESCRIPTION OF THE ACCOMPANYING DRAWINGS

Other objects and advantages of the present invention will become more apparent from the following detailed description of preferred embodiments thereof, taken in conjunction with the accompanying drawings, wherein.

DETAILED DESCRIPTION OF THE INVENTION

The method for joining a fiberglass plastic rod to a metal fitting will now be described in greater detail with reference to the case when pulse loading is effected by means of an explosion.

Figure 1:
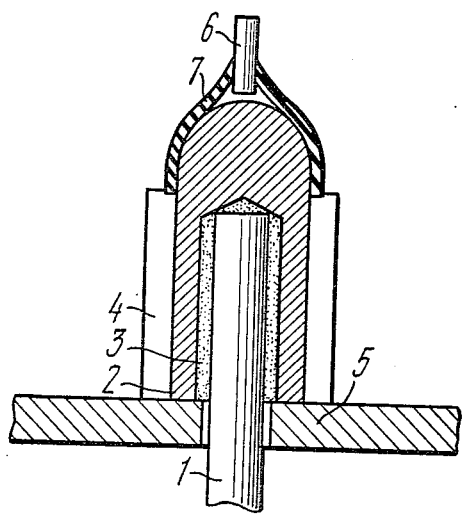
FIG. 1 is an elevation view of a fiberglass plastic rod with one of its ends arranged in a metal terminator prior to compression, in accordance with the invention.

A fiberglass plastic rod 1 (FIG. 1) is joined to a metal fitting 2, for example, a terminator (the reference numeral 2 will henceforth designate a terminator) as follows. In the metal terminator 2 there is provided a bore of a diameter somewhat greater than that of the fiberglass plastic rod 1. One of the ends of the rod 1 is placed into the bore, and the gap defined between the bore formed in the terminator 2 and rod 1 is filled with a porous material to form a porous layer 3. The function of the layer 3 is to absorb impact energy and compress under impact loads.

The porous layer 3 may comprise a powdered material, particularly, powders of metals, oxides, nitrides, carbides and mixtures thereof, e.g. Al, Cr, $Al_2O_3$, AlN, BN+Ni, WC. The porous layer 3 may comprise a mixture of metal powder and ceramics, or powdered aluminum nitride. The particle size is dependent upon the width of the gap between the rod 1 and terminator 2 and varies from a few microns to 0.1 of the gap width. The gap is filled after one of the ends of the rod 1 is installed in the hole provided in the terminator 2.

The porous layer 3 may comprise a metal grid or fibrous structure, for example, metal mesh, wire, chips, etc., in which case the porous layer 3 is formed directly over the end of the fiberglass plastic rod 1, whereupon that end is installed in the bore provided in the terminator 2. The thickness of the grid or mesh, the wire gauge, etc. are dependent on the width of the gap between the rod 1 and terminator 2.

A layer 4 of an explosive is then symmetrically arranged over the outer surface of the metal terminator 2. The explosive may be ammonite. The layer 4 may be formed by a bag containing a powdered explosive. The explosive may also be used in the form of cast or pressed charges, or be applied onto some fabric.

The terminator 2 with its fiberglass rod 1 are then placed on a metal plate, whereupon an explosion is made, for example, with the aid of a blasting cap 6 and detonating cords 7.

As the layer 4 detonates on the surface of the metal terminator 2, the latter compresses the porous layer 3. The role of the porous layer 3 is to reduce excessive impact loads on and to provide for more uniform loading of the fiberglass plastic rod 1 in the course of pulse loading. As the layer 3 compresses, it acquires a considerable shear strength, whereby the fiberglass plastic rod 1 is reliably joined to the metal terminator 2.

By appropriately selecting the shape of the metal fitting, which in the present case is the terminator 2, one can ensure a desired distribution of pressure over the length of the built-in portion of the rod 1. Strength requirements may call for a maximum pressure at the center of that portion. This object may be attained by varying the thickness of the terminator 2, as well as the thickness of the layer 4 of explosive and its concentration around the built-in portion of the rod 1.

Figure 2:
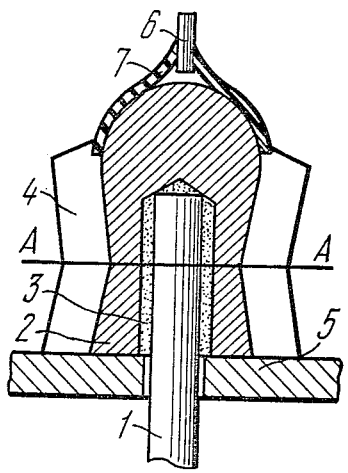
FIG. 2 is an elevation view of a fiberglass plastic rod with one of its ends arranged in a metal terminator of a variable thickness prior to compression, in accordance with the invention.
Figure 3:
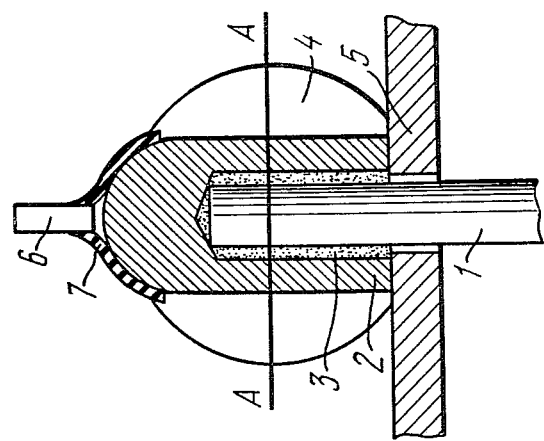
FIG. 3 is an elevation view of the rod and terminator of FIG. 1 with a layer of an explosive of a variable thickness.

According to FIG. 2, the metal terminator 2 is of a variable thickness which is at its minimum on section A—A, where a maximum pressure is produced. A similar effect is observed with a variable thickness of the layer 4 of explosive around the terminator 2 (FIG. 3). A maximum thickness of the layer 4 on section A—A accounts for a maximum pressure in that zone.

By changing the concentration of the layer 4 of explosive around the metal terminator 2 (FIG. 1), for example, by increasing the concentration at the center and reducing it at the ends of said terminator 2, one can produce a maximum pressure in the central portion of the terminator 2.

Figure 4:
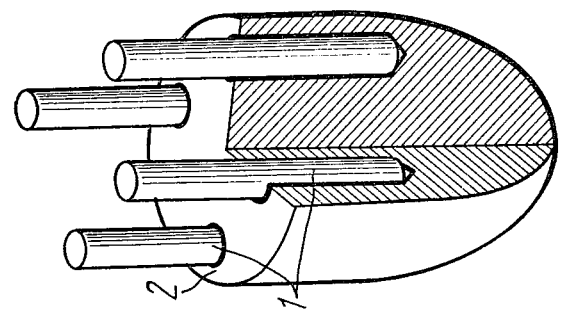
FIG. 4 is an isometric view of a terminator with four built-in fiberglass plastic rods, in accordance with the invention.

The method according to the invention makes it possible to join a plurality of fiberglass plastic rods 1 to a single metal terminator 2 (FIG. 4). For this purpose, a plurality of bores in a number corresponding to that of the rods 1 are symmetrically made in the terminator 2 around its central axis. Each of said bores receives one end of a respective rod 1, all the remaining operations being performed as described above.

Figure 5:
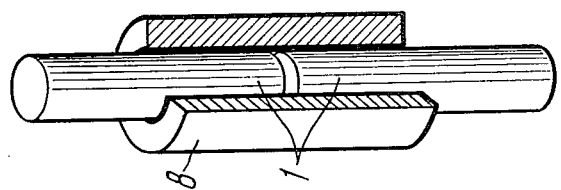
FIG. 5 is an isometric view of a metal connection fitting with two built-in fiberglass plastic rods, in accordance with the invention.

According to the invention, it is also possible to join fiberglass plastic rods 1 (FIG. 5) by means of a metal connection fitting 8. This may come in handy in repairing guys, spacers, etc.

Pulse loading and the resultant compression of the metal fitting may be effected in other ways, for example, magnetohydrodynamically, i.e. by an electromagnetic field.

What is claimed is:

1. A method for joining a fiberglass plastic rod to a metal fitting of an electrical device, comprising the steps of
providing a bore in said metal fitting, the diameter of said bore somewhat greater than that of said fiberglass plastic rod;
inserting one of the ends of said fiberglass plastic rod into said bore;
filling the gap defined between said fiberglass plastic rod and said bore provided in said metal fitting with a porous material to form a porous layer; and
compressing said metal fitting by pulse loading, by providing an explosive charge around said fitting in the region of said bore and shaping the explosive charge to have a maximum thickness at a cross-section which intersects said bore, and thereafter igniting said explosive charge to apply a maximum pressure to said rod at said cross-section to compressively join said fiberglass plastic rod and said metal fitting.

2. A method as claimed in claim 1, whereby said porous layer comprises a powdered material.

3. A method as claimed in claim 1, whereby said porous layer comprises a metal grid structure.

4. A method as claimed in claim 1, whereby said porous layer comprises a fibrous metal structure.

5. A method as claimed in claim 1, wherein said metal fitting has a reduced thickness portion at said cross-section whereby a maximum pressure is applied to said rod in the region of said cross-section upon said pulse loading compression step being performed.

* * * * *